US009437045B2

(12) United States Patent
Arendash et al.

(10) Patent No.: US 9,437,045 B2
(45) Date of Patent: Sep. 6, 2016

(54) REAL-TIME MOBILE CAPTURE AND APPLICATION OF PHOTOGRAPHIC IMAGES AS TEXTURES IN THREE-DIMENSIONAL MODELS

(71) Applicant: FUJI XEROX CO., LTD., Tokyo (JP)

(72) Inventors: David Joseph Arendash, Fremont, CA (US); Maribeth Joy Back, Los Gatos, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 108 days.

(21) Appl. No.: 13/934,617

(22) Filed: Jul. 3, 2013

(65) Prior Publication Data

US 2015/0009206 A1     Jan. 8, 2015

(51) Int. Cl.
*G06T 15/00*     (2011.01)
*G06T 19/00*     (2011.01)
*G06T 15/04*     (2011.01)

(52) U.S. Cl.
CPC .............. *G06T 19/006* (2013.01); *G06T 15/04* (2013.01)

(58) Field of Classification Search
CPC . G06T 15/04; G06T 19/006; G06T 2200/04; G06T 2207/10004; G06T 7/0059
See application file for complete search history.

(56) References Cited

U.S. PATENT DOCUMENTS

| | | | |
|---|---|---|---|
| 8,749,580 B1 * | 6/2014 | Lininger | 345/629 |
| 2005/0199782 A1 * | 9/2005 | Calver et al. | 250/208.1 |
| 2014/0022281 A1 * | 1/2014 | Georgeson | B64F 5/0045 345/633 |
| 2014/0129995 A1 * | 5/2014 | Coddington | 715/863 |
| 2014/0210947 A1 * | 7/2014 | Finn et al. | 348/46 |
| 2014/0247280 A1 * | 9/2014 | Nicholas et al. | 345/633 |

OTHER PUBLICATIONS

Ooi, Indexing in Spatial Databases, Google Scholar, Unpublished/Technical Papers, 1993, 72 pgs.
Lee, Modeling Real Objects Using Video See-Through Augmented Reality, Presence, vol. 11, No. 2, Apr. 2002, 14 pgs.
Piekarski, Augmented Reality Working Planes: A Foundation for Action and Construction at a Distance, Wearable Computer Laboratory, School of Computer and Information Science, University of South Australia, Proceedings of the Third IEEE and ACM International Symposium on Mixed and Augmented Reality (ISMAR 2004), 10 pgs.
You, Fusion of Vision and Gyro Tracking for Robust Augmented Reality Registration, Virtual Reality, Proceedings IEEE, Mar. 2001, 9 pgs.
Reynolds, Exploiting Linked Open Data for Mobile Augmented Reality, W3C Workshop: Augmented Reality on the Web, Jun. 2010, 7 pgs.
Piekarski, Interactive Augmented Reality Techniques for Construction at a Distance of 3D Geometry, Immersive Projection Technology/Eurographics Virtual Environments Conference, May 22-23, 2003, 10 pgs.
Pierce, Image Plane Interaction Techniques in 3D Immersive Environments, Symposium on Interactive 3D Graphics, 1997, 5 pgs.

* cited by examiner

*Primary Examiner* — Kee M Tung
*Assistant Examiner* — Frank Chen
(74) *Attorney, Agent, or Firm* — Morgan, Lewis & Bockius LLP

(57) ABSTRACT

A computer-implemented method for obtaining texture data for a three-dimensional model is disclosed. The method is performed at a portable electronic device including a camera, one or more processors, and memory storing one or more programs. The method includes obtaining an image of one or more objects with the camera. The method also includes concurrently displaying at least a portion of the image with one or more objects in the three-dimensional model. The one or more objects in the three-dimensional model at least partially overlay the one or more objects in the image. The method furthermore includes storing at least one or more portions of the image as texture data for one or more of the one or more objects in the image.

20 Claims, 14 Drawing Sheets

604

606 The one or more objects in the three-dimensional model correspond to the one or more objects in the image

608 Align the representation of the one or more objects in the three-dimensional model with the at least a portion of the image

610 Receive one or more touch gestures on a touch-sensitive display, and align the representation of the one or more objects in the three-dimensional model in accordance with the one or more touch gestures

612 Aligning the one or more objects includes one or more of: scaling the representation of the one or more objects in the three-dimensional model; panning the representation of the one or more objects in the three-dimensional model; and rotating the representation of the one or more objects in the three-dimensional model

614 The image includes one or more augmented reality markers. Align the representation of the one or more objects in the three-dimensional model in accordance with respective locations of the one or more augmented reality markers.

616 Calibrate one or more of a location and an orientation of the device in accordance with at least one of the one or more augmented reality markers

618 Information for the one or more augmented reality markers is received at the device from a remote server

620 Information for a plurality of augmented reality markers is stored in the remote server. The information for the plurality of augmented reality markers includes information for the one or more augmented reality markers received at the device, and the one or more augmented reality markers received at the device are selected in accordance with a location of the device.

Figure 6B

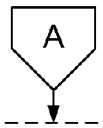

630 The at least one or more portions of the image are sent to a remote server as texture data for one or more of the one or more objects in the image 632 Additional texture data is sent to the remote server from a plurality of portable electronic devices, distinct from the portable electronic device 634 Receive an image rendered from information for one or more objects in the three-dimensional model and texture data for the one or more objects in the three-dimensional model, and display at least a portion of the rendered image 636 Receive a touch gesture on the touch-sensitive display; and adjust the texture data in accordance with the touch gesture 638 Adjusting the texture data includes one or more of: positioning the texture data onto one or more objects in the three-dimensional model; resizing the texture data; and cropping the texture data 640 Receive information for camera placement, the information for camera placement based at least on a viewing angle and a field of view with respect to one or more objects

Figure 6C

REAL-TIME MOBILE CAPTURE AND APPLICATION OF PHOTOGRAPHIC IMAGES AS TEXTURES IN THREE-DIMENSIONAL MODELS

TECHNICAL FIELD

The disclosed embodiments relate generally to computer-assisted image capture and processing. More particularly, the disclosed embodiments relate to computer-assisted image capture and processing for use in three-dimensional models.

BACKGROUND

The use of three-dimensional (3D) environments is gaining more popularity. For example, some games involve a user taking actions in a virtual three-dimensional environment. Three-dimensional environments are also used for education and training, surgical operations, entertainments (e.g., movies), etc.

Three-dimensional environments are typically represented by three-dimensional models. A typical three-dimensional model includes information including properties of three-dimensional objects, such as a texture of a respective three-dimensional object. The texture plays an important role in making the respective three-dimensional object appear more realistic in the three-dimensional environment. However, collection and application of accurate and appropriate texture is difficult and time-consuming.

SUMMARY

A number of embodiments (e.g., devices, methods of operating such devices, and computer readable storage media storing instructions for use in such devices) that overcome the limitations and disadvantages described above are presented in more detail below. These embodiments provide methods and systems for obtaining texture data.

As described in more detail below, some embodiments involve a method for obtaining texture data for a three-dimensional model. The method is performed at a portable electronic device including a camera, one or more processors, and memory storing one or more programs. The method includes obtaining an image of one or more objects with the camera, and concurrently displaying at least a portion of the image with a representation of one or more objects in the three-dimensional model. The representation of the one or more objects in the three-dimensional model at least partially overlays the one or more objects in the image. The method also includes storing at least one or more portions of the image as texture data for one or more of the one or more objects in the image.

In accordance with some embodiments, a portable electronic device includes a camera; one or more processors; and memory storing one or more programs for execution by the one or more processors. The one or more programs include instructions for: obtaining an image of one or more objects with the camera; and concurrently displaying at least a portion of the image with a representation of one or more objects in a three-dimensional model. The representation of the one or more objects in the three-dimensional model at least partially overlays the one or more objects in the image. The one or more programs also include instructions for storing at least one or more portions of the image as texture data for one or more of the one or more objects in the image.

In accordance with some embodiments, a computer readable storage medium stores one or more programs for execution by one or more processors of an electronic device with a camera. The one or more programs include instructions for: obtaining an image of one or more objects with the camera; and concurrently displaying at least a portion of the image with a representation of one or more objects in the three-dimensional model. The representation of the one or more objects in a three-dimensional model at least partially overlays the one or more objects in the image. The one or more programs also include instructions for storing at least one or more portions of the image as texture data for one or more of the one or more objects in the image.

BRIEF DESCRIPTION OF THE DRAWINGS

For a better understanding of the aforementioned aspects of the embodiments as well as additional aspects and embodiments thereof, reference should be made to the Description of Embodiments below, in conjunction with the following drawings in which like reference numerals refer to corresponding parts throughout the figures.

FIGS. 6A-6C are flowcharts representing a method of obtaining texture data for a three-dimensional model in accordance with some embodiments.

Like reference numerals refer to corresponding parts throughout the drawings.

DESCRIPTION OF EMBODIMENTS

Methods and systems for obtaining texture data for three-dimensional models are described. Reference will be made to certain embodiments, examples of which are illustrated in the accompanying drawings. It will be understood that it is not intended to limit the scope of claims to these particular embodiments alone. On the contrary, it is intended to cover alternatives, modifications and equivalents that are within the spirit and scope as defined by the appended claims.

In some embodiments, a three-dimensional model is displayed in a display of a mobile imaging device, such as a digital camera, a mobile electronics device with a camera (e.g., a smartphone or tablet computer), or a laptop computer. In conjunction with displaying the three-dimensional model, the imaging device is configured to capture images of real-world textures that can then be selectively applied to one or more surfaces of the three-dimensional model. In some embodiments, the real-world textures can be applied to surfaces of the three-dimensional model via the display of the imaging device. In some embodiments, the model and captured textures can be viewed concurrently in the display using either the texture or the model as a translucent overlay on the other. In some embodiments, a displayed texture can be applied to corresponding portions of a displayed three-dimensional model. For example, a user of the imaging device can apply a wood texture to a model of a wood table by imaging a wood texture and applying in device the imaged wood texture to a portion of the model that is concurrently displayed with the imaged texture.

In some embodiments, the mobile imaging device provides a user interface that enables a user of the imaging device to select which portion of the captured texture should be applied to one or more surfaces of the three-dimensional model and/or to select a particular surface or portion of the three-dimensional model to which a particular captured texture is applied. In some embodiments, the resulting model and the associated applied textures can be saved and exported for use in other programs, such as desktop modeling or computer aided design programs.

Figure 1:
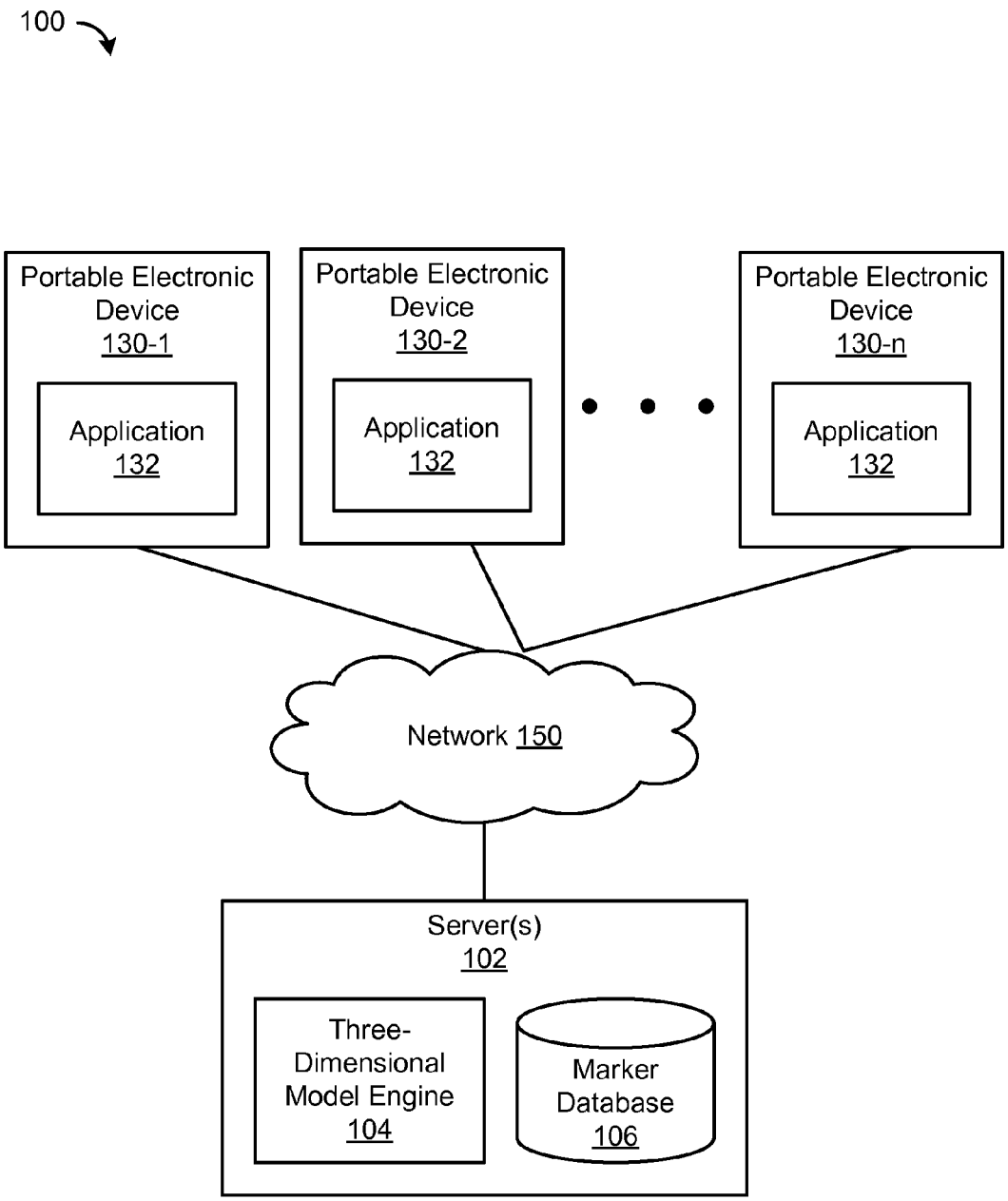
FIG. 1 is a block diagram illustrating a system for obtaining texture for a three-dimensional model in accordance with some embodiments.

FIG. 1 is a block diagram illustrating a system 100 for obtaining texture data, according to some embodiments. The system 100 includes one or more servers 102 and one or more portable electronic devices 130 (e.g., 130-1, 130-2 through 130-n). The one or more servers 102 and the portable electronic devices 130 are coupled with each other via network 150. The network 150 can generally include any type of wired or wireless communication channel capable of coupling together computing nodes. This includes, but is not limited to, a local area network, a wide area network, or a combination of networks. In some embodiments, the network 150 includes the Internet.

The portable electronic devices 130 can be any of a number of portable computing devices (e.g., personal digital assistant, cell phone, gaming device, desktop computer, laptop computer, handheld computer, digital camera, or combinations thereof) used to enable the activities described below. The portable electronic devices 130 are also referred to herein as clients. A portable electronic device 130 includes one or more camera and a display. In some embodiments, the portable electronic device 130 is also referred to herein as a mobile imaging device.

In some embodiments, the one or more servers 102 include a three-dimensional model engine 104, and a marker database 106. In some embodiments, the one or more servers 102 also include one or more other databases (e.g., three-dimensional model database, texture database, etc.). The one or more servers 102 communicate with databases internal to the one or more servers 102, such as marker database 106 using a local area network, by internal communication buses, or by any other appropriate mechanism or combination of mechanisms.

The applications 132 include application programs used for providing various functionalities to portable electronic devices 130. In some embodiments, the applications 132 include a software application used for obtaining texture data (also referred to herein as texture).

In some embodiments, the marker database 106 includes marker information, such as patterns, locations, and orientations for respective markers. In some embodiments, the markers are associated with textures.

Figure 2:
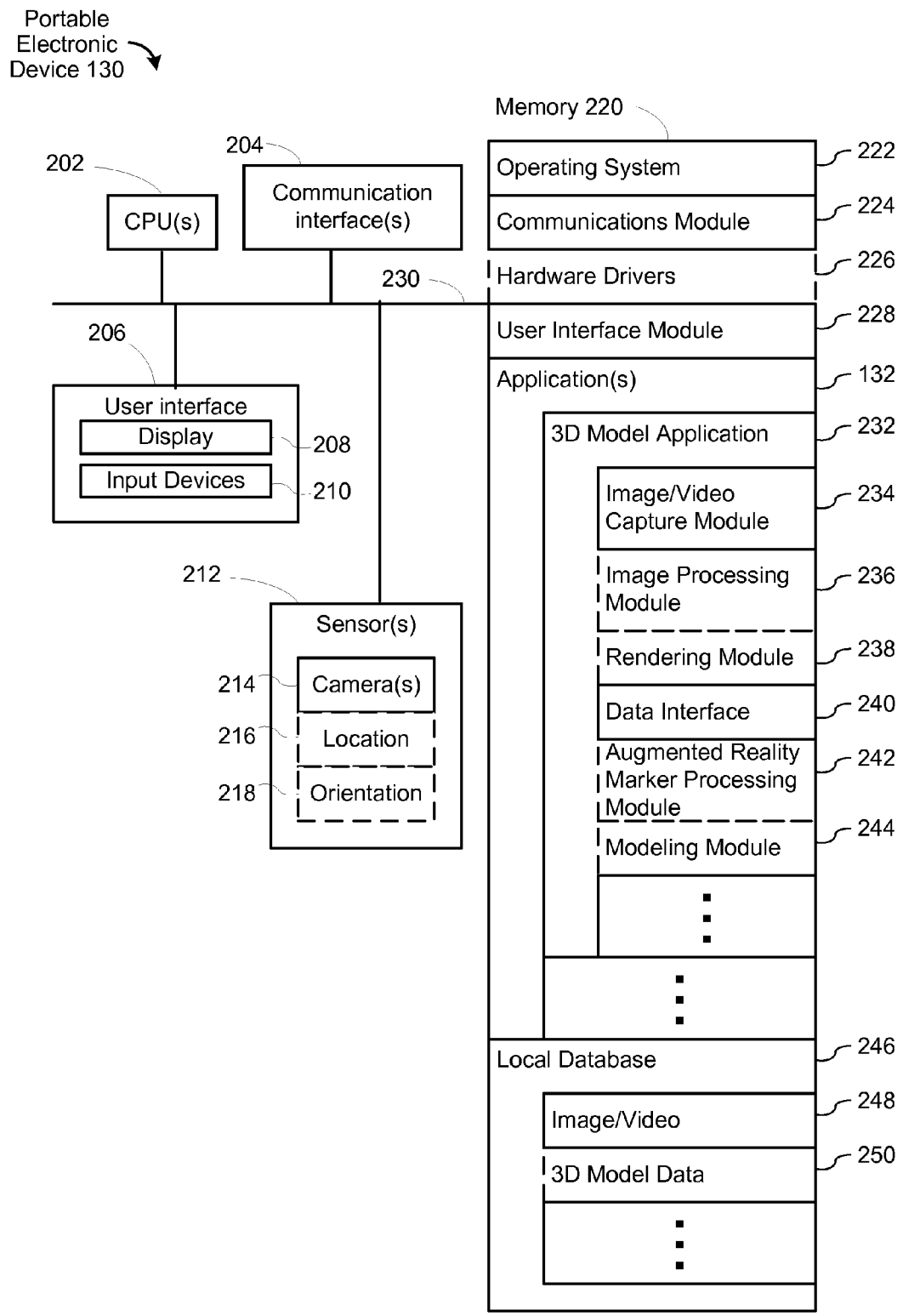
FIG. 2 is a block diagram illustrating a portable electronic device in accordance with some embodiments.

FIG. 2 is a block diagram illustrating a portable electronic device 130, according to some embodiments. The portable electronic device 130 typically includes one or more processing units (CPUs) 202, one or more network or other communications interfaces 204, a user interface 206, one or more sensors 212, memory 220, and one or more communication buses 230 for interconnecting these components. In some embodiments, the communication buses 230 include circuitry (sometimes called a chipset) that interconnects and controls communications between system components. The user interface 206 includes a display device 208 and one or more input devices 210 (e.g., buttons, touch-sensitive surface, etc.). The one or more sensors 212 include one or more cameras 214. In some embodiments, the one or more sensors 212 also include one or more location sensors 216 and one or more orientation sensors 218. Memory 220 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 220 may optionally include one or more storage devices remotely located from the CPU(s) 202. Memory 220, or alternately the non-volatile memory device(s) within memory 220, comprises a non-transitory computer readable storage medium. In some embodiments, memory 220 stores the following programs, modules and data structures, or a subset thereof:

- an operating system 222 that includes procedures for handling various basic system services and for performing hardware dependent tasks;
- a communication module 224 that is used for connecting the portable electronic device 130 to other computers via the one or more communication interfaces 204 (wired or wireless) and one or more communication networks, such as the Internet, other wide area networks, local area networks, metropolitan area networks, and so on;
- (optional) hardware drivers 226 used to control operations of, and to transfer data to and/or from, one or more hardware components (e.g., the display 208, the one or more input devices 210, and the one or more sensors 212, such as the one or more cameras 214);
- a user interface module 228 that receives commands and/or user inputs from the user via the input devices 210 and prepares user interface objects for display in the display device 208;
- applications 132 that includes one or more applications, including a three-dimensional model application 132; and
- a local database 246 that includes image and/or video data 248.

In some embodiments, the three-dimensional model application 132 includes the following programs, modules and data structures, or a subset or superset thereof:

- an image and/or video capture module 234, which receives a video or image from the one or more cameras 214 through the one or more communication buses 230 by using the hardware drivers 226;
- (optional) an image processing module 236, which modifies images (e.g., rotating, resizing, moving one or more portions of an image);
- a rendering module 238, which prepares an image to be displayed in the display device 208 and optionally prepares an image from a three-dimensional model data (e.g., three-dimensional model data 250), if available;
- a data interface 240, which facilitates storing data into, and/or retrieving data from, a local database;
- (optional) an augmented reality marker processing module 242, which identifies, and extracts information from, one or more augmented reality markers included in one or more images and/or videos; and
- (optional) a modeling module 244, which creates and/or modifies one or more three-dimensional model based on user inputs and image and/or video data.

In some embodiments, the local database 246 also includes three-dimensional model data 250. In some embodiments, the three-dimensional model data 250 is used by the rendering module 238.

Each of the above identified elements may be stored in one or more of the previously mentioned memory devices, and corresponds to a set of instructions for performing a function described above. The above identified modules (i.e., sets of instructions) need not be implemented as separate software programs, procedures or modules, and thus various subsets of these modules may be combined or otherwise re-arranged in various embodiments. For example, the rendering module 238 may be implemented as part of the user interface module 228, or vice versa. In some embodiments, memory 220 stores a subset of the modules and data structures identified above. Furthermore, in some embodiments, memory 220 store additional modules and data structures not described above.

Figure 3:
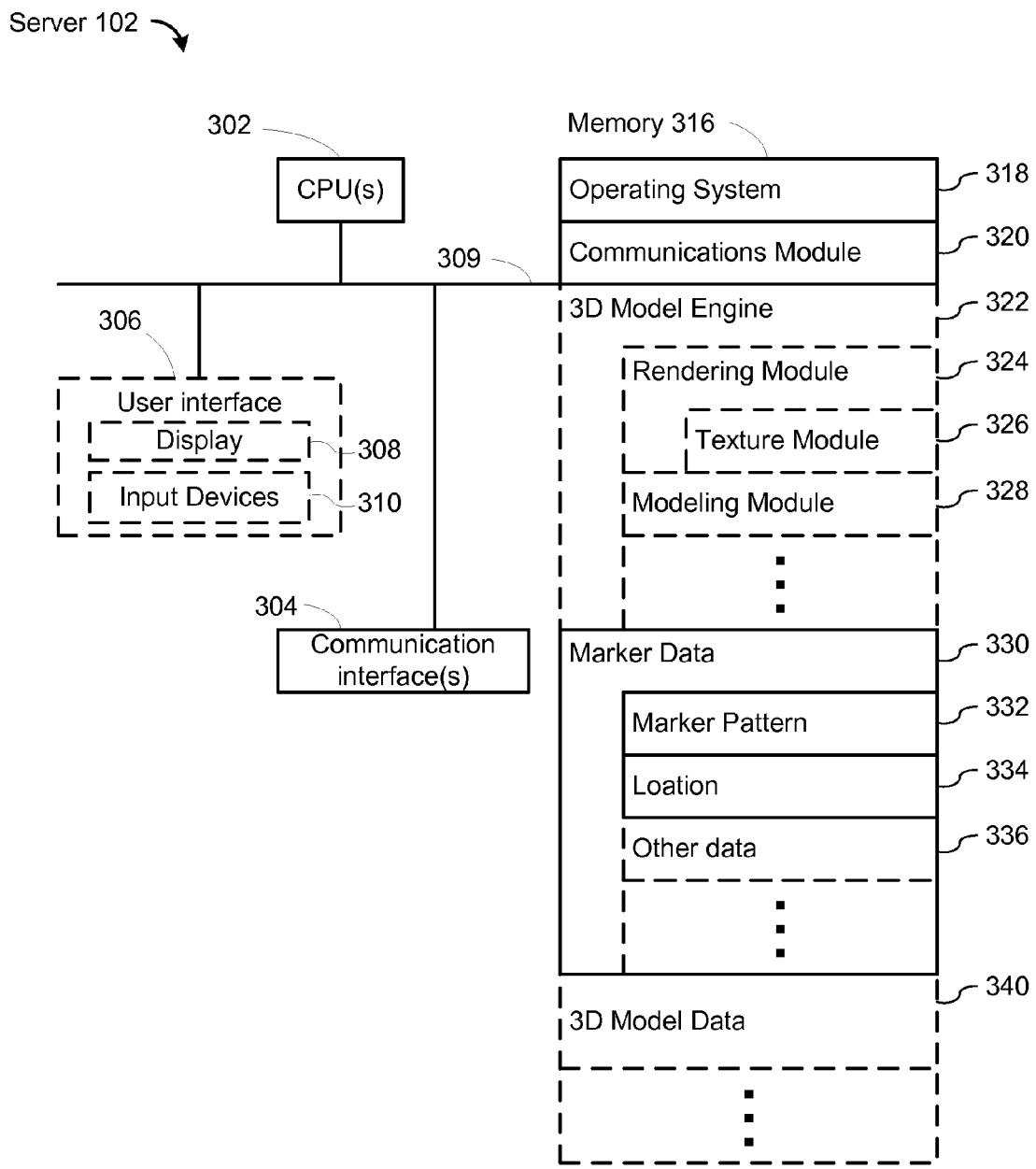
FIG. 3 is a block diagram illustrating a server in accordance with some embodiments.

FIG. 3 is a block diagram illustrating a server 102, in accordance with some embodiments. The server 102 (also called herein a server system) typically includes one or more processing units (CPUs) 302, one or more network or other communications interfaces 304, memory 316, and one or more communication buses 309 for interconnecting these components. In some embodiments, the communication buses 309 include circuitry (sometimes called a chipset) that interconnects and controls communications between system components. In some other embodiments, the server 102 includes a user interface 306 (e.g., a user interface having a display device 308, and one or more input devices 310, such as a keyboard, and a mouse or other pointing device), but more typically the server 102 is controlled from and accessed by various client systems.

Memory 206 of the server 102 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 316 may optionally include one or more storage devices remotely located from the CPU(s) 302. Memory 316, or alternately the non-volatile memory device(s) within memory 316, comprises a non-transitory computer readable storage medium. In some embodiments, memory 316 or the computer readable storage medium of memory 316 stores the following programs, modules and data structures, or a subset thereof:
- an operating system 318 that includes procedures for handling various basic system services and for performing hardware dependent tasks;
- a network communication module (or instructions) 320 that is used for connecting the server 102 to other computers (e.g., portable electronic devices 130) via the one or more communications interfaces 304 and one or more communications networks 150 (FIG. 1), such as the Internet, other wide area networks, local area networks, metropolitan area networks, and so on;
- (optional) a three-dimensional model engine 322 that generates three-dimensional model data and/or prepares images from the three-dimensional model data (e.g., three-dimensional model data 340);
- marker data 330; and
- (optional) three-dimensional model data 340.

In some embodiments, the three-dimensional model engine 322 includes the following programs, modules and data structures, or a subset or superset thereof:
- a rendering module 324 for preparing one or more images from three-dimensional data; and
- a modeling module 328 for generating and/or revising three-dimensional data.

In some embodiments, the rendering module 324 includes a texture module 326 for applying texture to three-dimensional objects in a three-dimensional model.

In some embodiments, the marker data 330 includes the following data structures, or a subset or superset thereof:
- marker pattern data 332 that includes information for identifying one or more marker patterns (e.g., a graphical pattern of a respective marker, such as a barcode, a matrix barcode, Quick Response code, etc.);
- location data 334 that includes location information of respective markers; and
- other data (e.g., orientation of respective markers, etc.).

In some embodiments, the marker data 330 includes data for augmented reality markers.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1, 2, and 3, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, the image processing module 236 is part of the image and/or video capture module 234. In some embodiments, the local database 246 includes the data interface 240. In some embodiments, the marker data 330 is part of the three-dimensional model data 340, or vice versa.

The actual number of servers used to implement the server 102 and how features are allocated among them will vary from one implementation to another, and may depend in part on the amount of data traffic that the system must handle during peak usage periods as well as during average usage periods, and may also depend on the amount of data stored by the server 102. Moreover, one or more of the blocks in FIG. 3 may be implemented on one or more servers designed to provide the described functionality. For example, the server 102 may be implemented in one or more three-dimensional model engine servers that provide the functionality of the three-dimensional model engine 322 and one or more separate marker servers that provide access to the marker data 330. Although the description herein refers to certain features implemented in a portable electronic device 130 and certain features implemented in a server 102, the embodiments are not limited to such distinctions. For example, features described herein as being part of a portable electronic device 130 can be implemented in whole or in part in a server 102, and vice versa.

In some embodiments, the portable electronic device 130 may be a "thin client," which includes a rendering module 238 that displays a representation of three-dimensional objects rendered by the server 102. In this embodiment, the portable electronic device 130 only captures and transfers image or video data, and receives and displays rendered images but does not include additional software. In thin client embodiments, computationally intensive tasks, such as generating three-dimensional model data and rendering images from three-dimensional model data are handled by the server 102.

Figure 4:
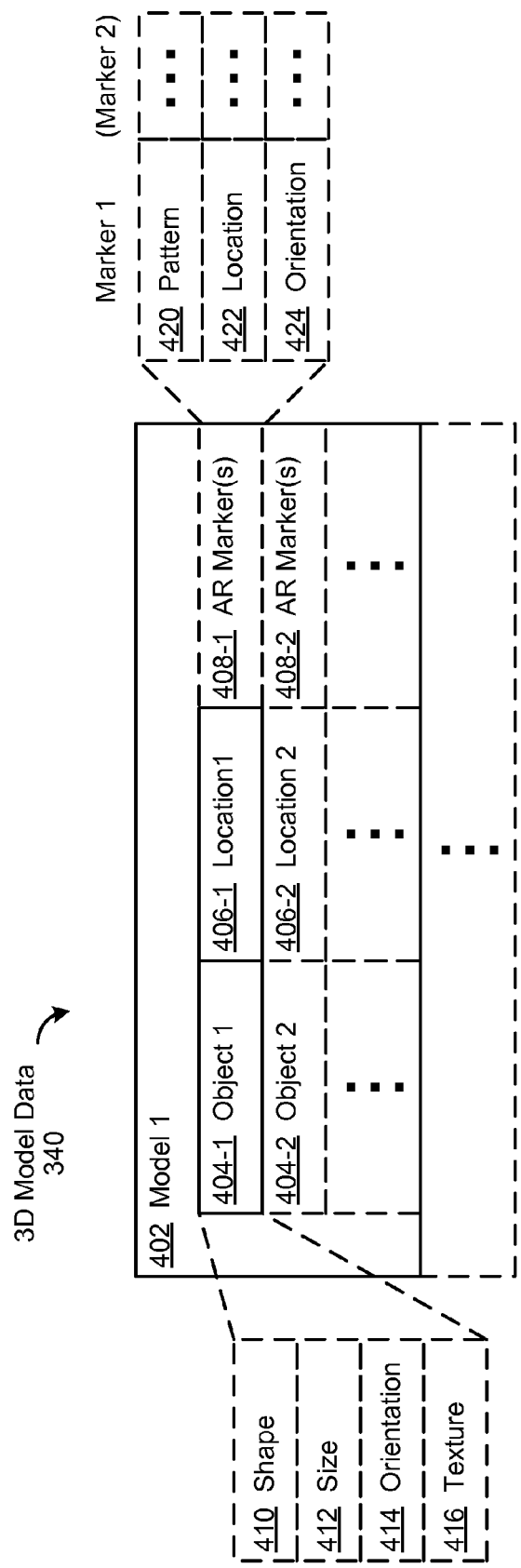
FIG. 4 is a block diagram illustrating exemplary three-dimensional model data in accordance with some embodiments.

FIG. 4 is a block diagram illustrating exemplary three-dimensional model data 340 in accordance with some embodiments. The three-dimensional model data 340 includes one or more three-dimensional models (e.g., "model 1" 402, "model 2," etc.).

As shown in FIG. 4, a respective model (e.g., "model 1" 402) includes information for one or more three-dimensional objects (e.g., "object 1" 404-1, "object 2" 404-2, etc.). In some embodiments, information for a respective object (e.g., "object 1" 404-1) includes information for one or more of: shape 410 (e.g., cube, rod, cylinder, sphere, etc.), size 412, orientation 414, and texture 416 of the respective object. In some embodiments, the texture 416 is a pointer to corresponding texture data (e.g., an image file). In some embodiments, the texture 416 indicates the absence of corresponding texture data (e.g., by including a null value).

In some embodiments, the respective model (e.g., "model 1" 402) also includes location information for one or more three-dimensional objects (e.g., "location 1" 406-1 for "object 1" 404-1 and "location 2" 406-2 for "object 2" 404-2, etc.).

In some embodiments, the respective model (e.g., "model 1" 402) also includes information identifying one or more markers (e.g., augmented reality markers) for a respective three-dimensional object. For example, in some cases, the respective three-dimensional object is be tagged with two or more augmented reality markers. In another case, the respective three-dimensional object is tagged with one augmented reality marker. In some embodiments, information identifying one or more markers includes one or more of: pattern 420, location 422, and orientation 424 of respective markers, which are described above with respect to FIG. 3.

In some embodiments, the one or more markers are used to identify a location of the respective three-dimensional object. For example, when the one or more markers are attached to the respective three-dimensional object, the location of the respective three-dimensional object is determined based on locations of the one or more markers. In some embodiments, the location of the respective three-dimensional object corresponds to a respective location of a respective marker attached to the respective three-dimensional object.

In some embodiments, the one or more markers are used to identify an orientation of the three-dimensional object (e.g., whether the three-dimensional object is positioned straight up, upside-down, or slanted). For example, when the one or more markers are attached to the respective three-dimensional object, the orientation of the three-dimensional object is determined based on orientations and/or locations of the one or more markers. In some embodiments, the orientation of the respective three-dimensional object corresponds to a respective orientation of a respective marker attached to the respective three-dimensional object. In some embodiments, the orientation 424 of a respective marker indicates a direction which the respective marker faces (e.g., north, south, east, and west). In some embodiments, the orientation 424 of the respective marker is indicated in a numerical unit (e.g., in degrees).

In some embodiments, the one or more markers are used to align the respective three-dimensional object (e.g., a real object in a live video or an image) with a corresponding object in a three-dimensional model (e.g., a virtual object). Alternatively, or additionally, in some embodiments, the one or more markers are used to align an object in the three-dimensional model with a three-dimensional object. In some embodiments, a location of a marker in the three-dimensional model is updated to match a location of a corresponding physical marker (e.g., in a live video or an image). In some embodiments, a location of the respective three-dimensional object associated with the marker is updated to match the location of the corresponding physical marker. For example, in some cases, when a physical marker in a live video or an image is detected at a location that does not correspond to a location of a corresponding marker in the three-dimensional model, the three-dimensional model is updated (e.g., panned, rotated, and/or scaled) so that the updated location of the marker in the three-dimensional model corresponds to the location of the physical marker in the live video or the image. In some cases, when multiple physical markers in the live video or the image are detected at locations that do not correspond to locations of corresponding markers in the three-dimensional model, the three-dimensional model is updated (e.g., panned, rotated, and/or scaled) so that the updated locations of the markers in the three-dimensional model correspond to the locations of the physical markers in the live video or the image. Typically, the location of the respective three-dimensional object is more accurate when it is updated using multiple physical markers.

FIGS. 5A-5G illustrate operations of a portable electronic device in accordance with some embodiments. The illustrated operations include mapping a real space to a three-dimensional model and using an image or video of the real space to place textures on corresponding surfaces of the three-dimensional model.

Figure 5A:
FIGS. 5A-5G illustrate operations of a portable electronic device in accordance with some embodiments.

FIG. 5A illustrates an image of one or more objects (e.g., real-world objects). In some embodiments, the portable electronic device includes a camera, and the image is obtained with the camera of the portable electronic device.

In some embodiments, the image of one or more objects is a still image of the one or more objects. In some other embodiments, the image of one or more objects is part of a video. For example, the portable electronic device may display a live video that includes one or more video frames with the image of the one or more objects. In such embodiments, the location of the portable electronic device in the overhead map is updated in accordance with a movement of the portable electronic device.

In some embodiments, as shown in FIG. 5A, an overhead map overlays the image of one or more objects. In some embodiments, the overhead map shows a location of the portable electronic device.

FIG. 5A also illustrates that a plurality of user interface objects are concurrently displayed with the image of one or more objects. For example, as shown in FIG. 5A, user interface objects, such as a reset button, a grab button, and a slider are displayed over the image of one or more objects. In some embodiments, as shown in FIG. 5A, one or more user interface objects (e.g., the reset button, the grab button, and the slider) are displayed semi-transparent over the image of one or more objects. In some embodiments, the slider, when adjusted (e.g., with a finger slide gesture on a touch-sensitive surface at a location that corresponds to the slider), initiates changing the field of view of a display of the one or more objects. In some embodiments, the grab button, when selected (e.g., with a tap gesture on a touch-sensitive surface at a location that corresponds to the grab button), initiates storing at least a portion of the image of one or more objects. In some embodiments, the reset button, when selected (e.g., with a tap gesture on a touch-sensitive surface at a location that corresponds to the reset button), initiates resetting settings for display of the one or more objects (e.g., field of view, zoom, rotation, etc.).

Figure 5B:
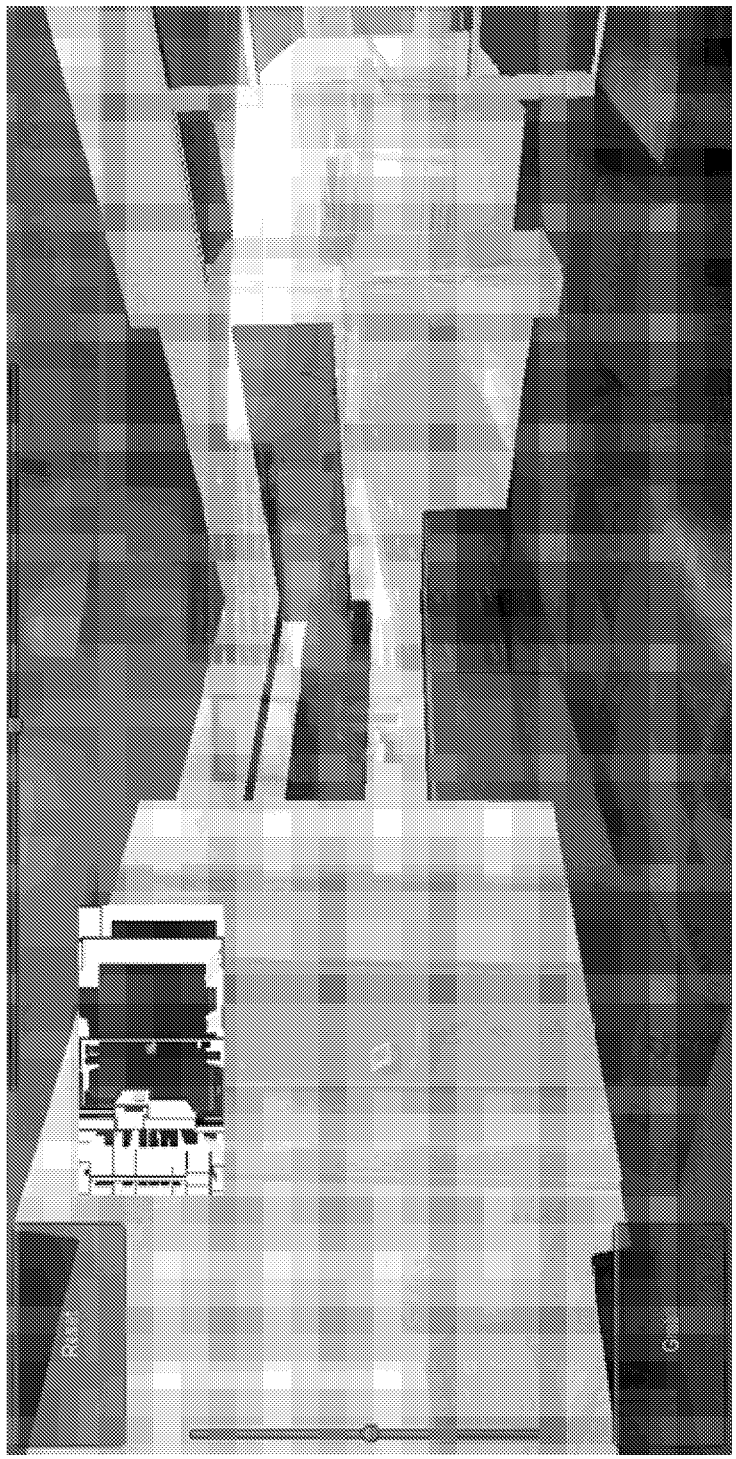

FIG. 5B illustrates a concurrent display of the image of one or more objects and a representation of one or more objects in a three-dimensional model. In some embodiments, the representation of one or more objects in the three-dimensional model includes a two-dimensional view of a wire frame model of the one or more objects in the three-dimensional model. In some embodiments, the concurrent display includes the image of one or more objects in a semi-transparent foreground layer and the representation of one or more objects in the three-dimensional model in a background layer. In some embodiments, as shown in FIG. 5B, the concurrent display includes the representation of one or more objects in the three-dimensional model in a semi-transparent foreground layer and the image of one or more objects in a background layer.

In some embodiments, as shown in FIG. 5B, the one or more objects in the three-dimensional model correspond to the one or more objects in the image (e.g., a door in the three-dimensional model corresponds to a door in the image). This enables direct comparison of the one or more objects in the three-dimensional model and the one or more corresponding objects in the image.

In some embodiments, the representation of the one or more objects in the three-dimensional model is aligned with the image of one or more objects. In some embodiments, at least a portion of the image of one or more objects is aligned with the representation of the one or more objects in the three-dimensional model. In some embodiments, the representation of the one or more objects in the three-dimensional model is aligned with the image of one or more objects using one or more markers (not shown).

Figure 5C:
Figure 5D:
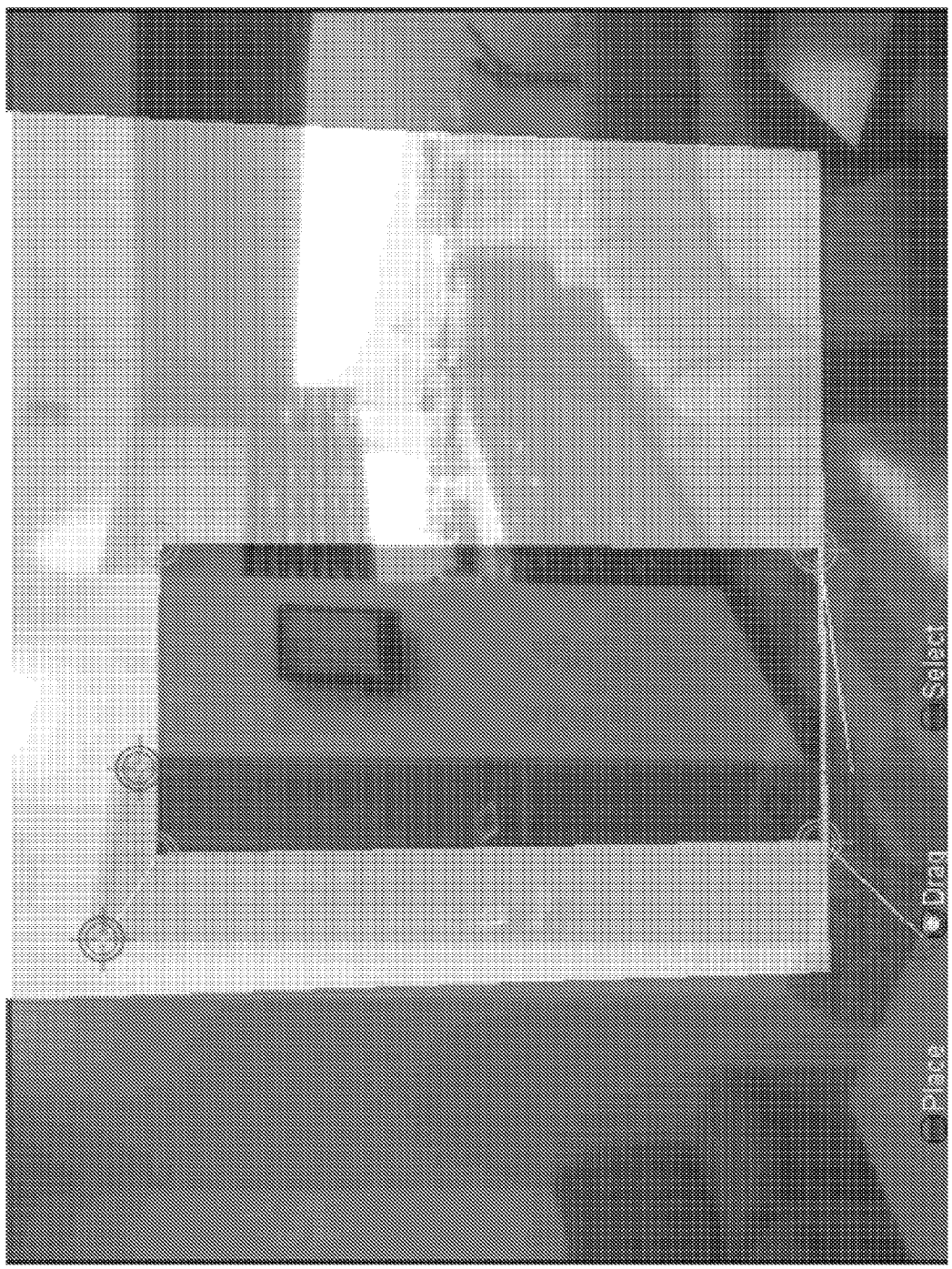
Figure 5E:
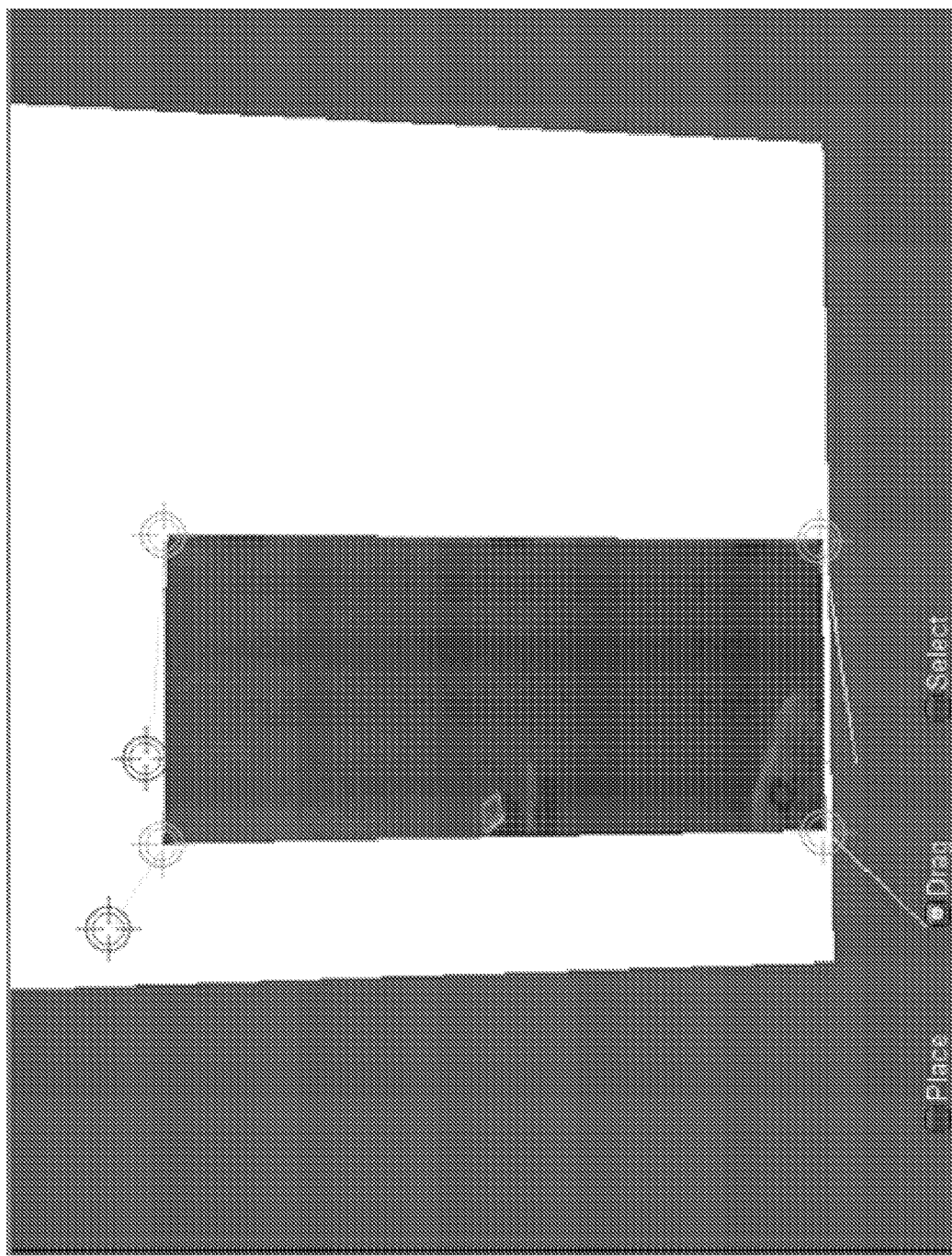

FIGS. 5C-5E illustrate aligning a portion of the image of one or more objects with the representation of the one or more objects in the three-dimensional model in accordance with some embodiments.

FIG. 5C illustrates that a first set of markers (shown in red) is placed at corners of a door in the image. In some embodiments, the first set of markers is placed independent of user input. For example, the first set of markers may be placed automatically (e.g. using edge detection and/or corner detection methods). In some embodiments, the first set of markers is placed in accordance with user input.

FIG. 5C also illustrates that a second set of markers (shown in green) is positioned. In some embodiments, the second set of markers is positioned manually (e.g., in accordance with user input). In some embodiments, the second set of markers is positioned independent of user input. For example, the second set of markers may be placed in accordance with a shape of a corresponding object in the three-dimensional model.

FIG. 5D illustrates a mapping (e.g., stretching) of a portion of the image (e.g., the door) in accordance with the first and second sets of markers. This converts a slanted view of the door in the image to a front view of the door, which may be used as texture for the door.

FIG. 5E illustrates a mapped image of the door, which may be used as texture for the door. Alternatively, or additionally, at least a portion of the mapped image of the door (made of wood) may be used as texture for another object made of wood (e.g., a table).

Figure 5F:
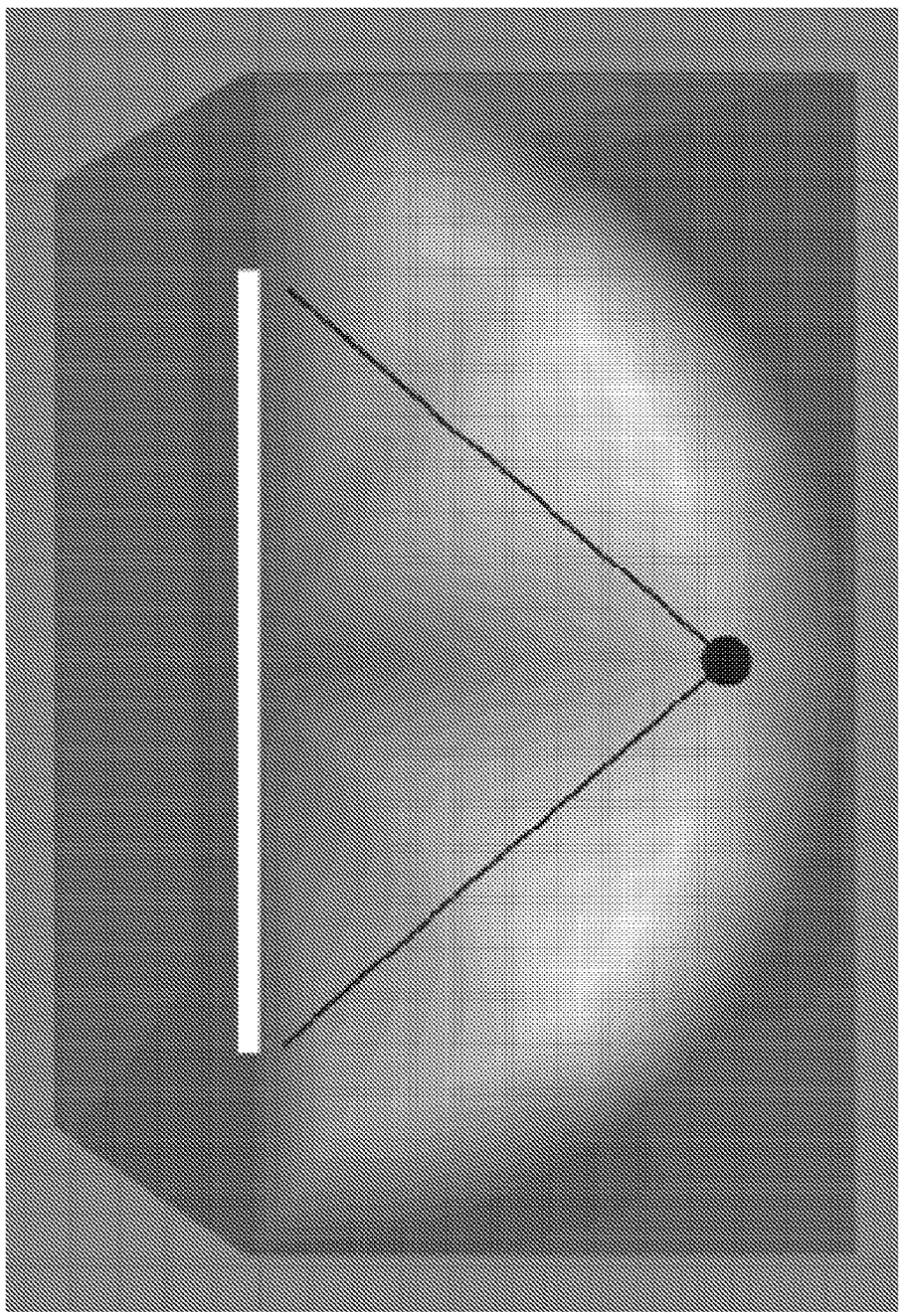
Figure 5G:
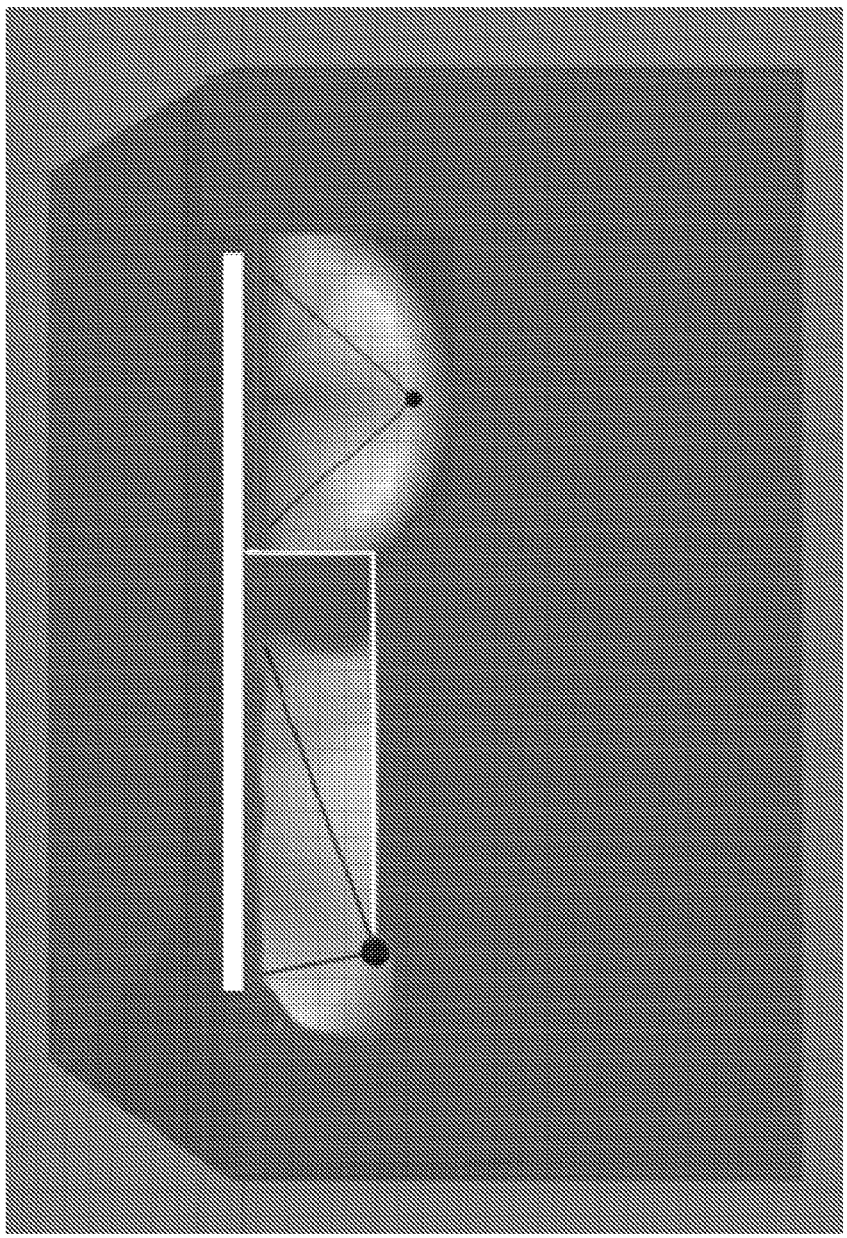

FIGS. 5F-5G illustrate user interfaces associated with obtaining texture for one or more objects in a three-dimensional model in accordance with some embodiments.

FIG. 5F illustrates a top-down view of an object for which texture data is to be collected. As shown in FIG. 5F, the object is indicated in white, a current position of a camera is indicated with a blue dot, and a field of view of the camera is indicated with blue lines. In some cases, if the camera is located too close to the object, the camera may not capture the entire object, which is not desirable. If the camera is located too far from the object, the camera may not capture a high resolution image of the object, which is not desirable. By weighing several factors, including these two, a recommended location of the camera for obtaining texture data for the object is determined. In some cases, whether the object is occluded by one or more other objects is also considered in determining the recommended location of the camera. In some cases, a total number of images that are needed to obtain a full coverage of the object is considered in determining the recommended location of the camera, because having to obtain too many images is not desirable. As shown in FIG. 5F, a color gradient may be used to indicate the recommended location of the camera. In FIG. 5F, a green area indicates recommended positions for obtaining texture data for the object, and a red area indicates positions that are not recommended for obtaining texture data for the object.

FIG. 5G illustrates that multiple camera positions (and optionally, field-of-views) are recommended for obtaining texture data for occluded surfaces. In FIG. 5G, the object is partially occluded with a wall. FIG. 5G shows that it would take images taken from at least two places and indicate recommended locations of the camera for obtaining texture data for the object.

Figure 6A:
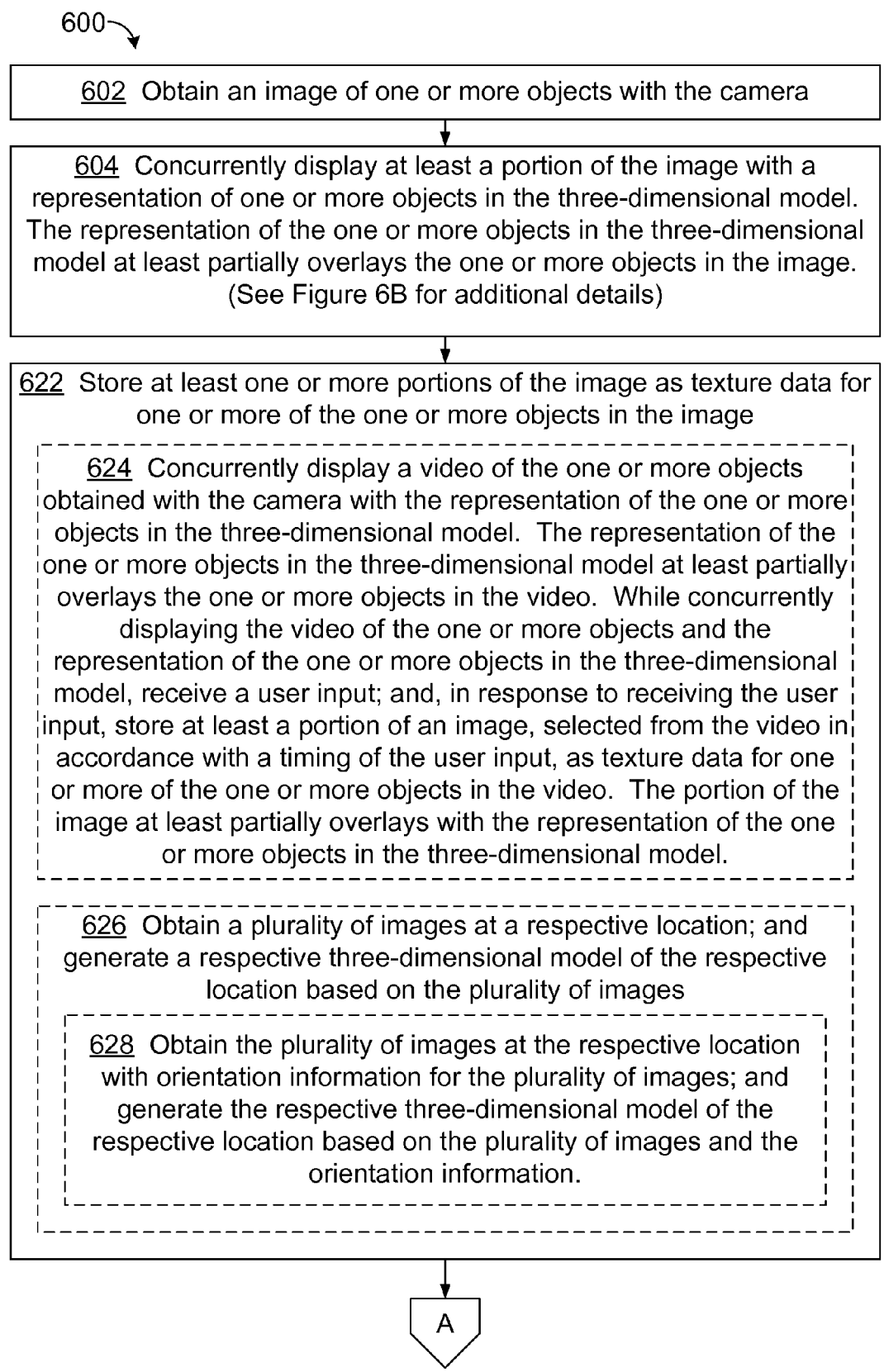

FIGS. 6A-6C are flowcharts representing a method 600 of obtaining texture data for a three-dimensional model, in accordance with some embodiments. In some embodiments, the method is performed at a portable electronic device that includes one or more processors and memory (e.g., CPUs 202 and memory 220, FIG. 2). In some embodiments, the portable electronic device includes a camera (e.g., an integrated camera, such as one or more cameras 214, FIG. 2). In some embodiments, the portable electronic device is coupled with a remote camera. In some embodiments, the portable electronic device includes a display and one or more input devices (e.g., display 208 and input devices 210, FIG. 2). In some embodiments, the one or more input devices include a touch-sensitive surface (e.g., a touch pad). In some embodiments, the touch-sensitive surface is integrated with the display (e.g., a touch-sensitive display). In some embodiments, the portable electronic device includes one or more location sensors (e.g., location sensors 216, FIG. 2). In some embodiments, the portable electronic device includes one or more orientation sensors (e.g., orientation sensors 218, FIG. 2).

A portable electronic device (e.g., the portable electronic device 130, FIG. 1) obtains (602) an image of one or more objects with the camera. For example, as shown in FIG. 5A, an image of objects in a room (e.g., a door, walls, etc.) is obtained.

The device concurrently displays (604) at least a portion of the image with a representation of one or more objects in the three-dimensional model. The representation of one or more objects in the three-dimensional model at least partially overlays the one or more objects in the image. An exemplary concurrent display of the image with a representation of one or more objects in the three-dimensional model is shown in FIG. 5B. As shown in FIG. 5B, the representation of one or more objects in the three-dimensional model (e.g., the door and walls in the three-dimensional model) at least partially overlays the one or more objects in the image (e.g., the door and walls in the image).

In some embodiments, the one or more objects in the three-dimensional model correspond (606) to the one or more objects in the image. For example, as shown in FIG. 5B, a representation of a door in the three-dimensional model overlays a door in the image. In some embodiments, the one or more objects in the three-dimensional model do not correspond to the one or more objects in the image. In some embodiments, when the representation of one or more objects in the three-dimensional model at least partially overlays one or more objects in the image, the one or more objects in the three-dimensional model are distinct from the one or more objects, in the image, that they overlay. For example, a representation of a table may overlay a door in the image.

In some embodiments, the device aligns (608) the representation of the one or more objects in the three-dimensional model with the at least a portion of the image. In some embodiments, aligning the representation of the one or more objects in the three-dimensional model with the at least a portion of the image includes rotating, scaling (or resizing), and/or cropping the representation of the one or more objects in the three-dimensional model. In some embodiments, the device aligns the portion of the image with the representation of the one or more objects in the three-dimensional model. In some embodiments, aligning the portion of the image with the representation of the one or more objects in the three-dimensional model includes rotating, scaling (or resizing), and/or cropping the portion of the image. In some embodiments, the device aligns the representation of the one or more objects in the three-dimensional model with the at least a portion of the image independent of user input. For example, the device automatically aligns the representation of the one or more objects in the three-dimensional model with the at least a portion of the image. In some embodiments, the device aligns the portion of the image with the representation of the one or more objects in the three-dimensional model independent of user input. For example, the device automatically aligns the portion of the image with the representation of the one or more objects.

In some embodiments, the device includes (610) a touch-sensitive display. The device receives one or more touch gestures on the touch-sensitive display, and aligns the representation of the one or more objects in the three-dimensional model in accordance with the one or more touch gestures.

In some embodiments, aligning the one or more objects includes (612) one or more of: scaling the representation of the one or more objects in the three-dimensional model; panning the representation of the one or more objects in the three-dimensional model; and rotating the representation of the one or more objects in the three-dimensional model.

In some embodiments, the image includes (614) one or more augmented reality markers (a barcode, a matrix barcode, Quick Response code, etc.). In some embodiments, the one or more augmented reality markers are physically attached to one or more real objects. The device aligns the representation of the one or more objects in the three-dimensional model in accordance with respective locations of the one or more augmented reality markers. For example, the device determines a location of a respective object with one or more augmented reality markers based on known locations of the one or more augmented reality markers.

In some embodiments, the device calibrates (616) one or more of a location and an orientation of the portable electronic device in accordance with at least one of the one or more augmented reality markers. For example, the device determines a location of the device based on known locations of the one or more augmented reality markers. In some embodiments, the device is determined to be adjacent to the one or more augmented reality markers (because the device can capture an image of the one or more augmented reality markers). In some embodiments, a more precise location of the device is determined based on the size of the one or more augmented reality markers and the angle at which the one or more augmented reality markers appear in the image. In some embodiments, the device determines the orientation of the device based on the known orientation of a respective augmented reality marker.

In some embodiments, information for the one or more augmented reality markers is received (618) at the portable electronic device from a remote server. For example, as shown in FIG. 1, the portable electronic device 130-1 may receive information for the one or more augmented reality markers from the server 102. In some embodiments, the information for the one or more augmented reality markers includes one or more of: pattern 420, location 422, and orientation 424 for respective augmented reality markers (FIG. 4).

In some embodiments, information for a plurality of augmented reality markers is stored (620) in the remote server (e.g., marker data 330 in server 102, FIG. 3). The information for the plurality of augmented reality markers includes information for the one or more augmented reality markers received at the portable electronic device, and the one or more augmented reality markers received at the portable electronic device are selected in accordance with a location of the portable electronic device. For example, the portable electronic device receives information for augmented reality markers located adjacent to the portable electronic device without receiving information for augmented reality markers that are not located adjacent to the portable electronic device. This reduces the amount of data transferred between the remove server and the portable electronic device. Because the portable electronic device is not likely to obtain an image with one or more augmented reality markers that are located far from the portable electronic device, this does not adversely affect the operation of the portable electronic device perceived by a user of the portable electronic device. In some embodiments, while the portable electronic device moves from a first region to a second region distinct from the first region, the portable electronic device receives information for one or more augmented reality markers adjacent to the first region and one or more augmented reality markers adjacent to the second region. In some embodiments, subsequent to the portable electronic device having moved from the first region to the second region, the portable electronic device receives information for one or more augmented reality markers adjacent to the second region without receiving information for one or more augmented reality markers adjacent to the first region.

The device stores (622) at least one or more portions of the image as texture data for one or more of the one or more objects in the image. For example, in some embodiments, the device stores the portion of an image (e.g., the image of a door, FIG. 5A) as texture data (e.g., texture 416, FIG. 4) for a particular object (e.g., a door object, in the three-dimensional model, that corresponds to the door in the image). In some embodiments, the device stores the portion of the image as texture data in local database 246 (FIG. 2). In some embodiments, the device transfers the portion of the image to be stored as texture data in a remote server (e.g., in three-model data 340 in FIG. 3).

In some embodiments, the device stores multiple images as texture data for a respective object in the image. For example, a single object may correspond to texture data in multiple separate images (e.g., a wall with different shadows at different times, a blackboard with different writings at different times, etc.).

In some embodiments, the device concurrently displays (624) a video of the one or more objects obtained with the camera with the representation of the one or more objects in the three-dimensional model. In some embodiments, the device concurrently displays a live-video of the one or more objects obtained with the camera with the representation of the one or more objects in the three-dimensional model. For example, the device captures and displays the live-video of the one or more objects in real-time. In some embodiments, the representation of the one or more objects in the three-dimensional model is updated in real-time in accordance with the location and orientation of the portable electronic device. For example, when the portable electronic device yaws, a view of real objects changes and a representation of one or more objects in the three-dimensional model are also updated. The representation of the one or more objects in the three-dimensional model at least partially overlays the one or more objects in the video. While concurrently displaying the video of the one or more objects and the representation of the one or more objects in the three-dimensional model, the device receives a user input; and, in response to receiving the user input, stores at least a portion of an image, selected from the video in accordance with a timing of the user input, as texture data for one or more of the one or more objects in the video. For example, the device detects a user input on the touch-sensitive surface at a location that corresponds to the grab button (FIG. 5B), and stores a frame of the video displayed when the user input is detected. The portion of the image at least partially overlays with the representation of the one or more objects in the three-dimensional model.

In some embodiments, the device obtains (626) a plurality of images at a respective location; and generates a respective three-dimensional model of the respective location based on the plurality of images. For example, the device may obtain a plurality of images of a room. In some embodiments, the device prepares a panoramic view of the room by stitching the plurality of images. Subsequently, the device identifies walls by using edge detection. For example, a vertical line may be recognized as a location where two walls meet. In some embodiments, a shadow on the two walls is used to determine respective orientation of the walls. Based on locations and orientations of the walls, the device generates a three-dimensional model of the room.

In some embodiments, the device includes (628) an orientation sensor. The device obtains the plurality of images at the respective location with orientation information for the plurality of images; and generates the respective three-dimensional model of the respective location based on the plurality of images and the orientation information. In the room-modeling example described above, the device may use orientation information of the plurality of images to generate a more accurate three-dimensional model of the room (e.g., an image of an east-side wall, an image of a north-side wall, etc.).

In some embodiments, the at least one or more portions of the image are sent (630) to a remote server as texture data for one or more of the one or more objects in the image. For example, the device may transfer a portion of the image to be stored as texture data in a remote server (e.g., in three-model data 340 in FIG. 3).

In some embodiments, additional texture data is sent (632) to the remote server from a plurality of portable electronic devices (e.g., the portable electronic devices 130-2 through 130-n, FIG. 1), distinct from the portable electronic device (e.g., the portable electronic device 130-1, FIG. 1). For example, a plurality of portable electronic devices may be provided to a plurality of users. Respective users may use respective portable electronic devices to obtain texture data of a particular region (e.g., inside a particular building). Because multiple portable electronic devices obtain texture data, this improves speed of obtaining texture data of a plurality of objects.

In some embodiments, the device receives from the remote server information that indicates one or more objects in the three-dimensional model that need texture data. For example, the remote server may determine that a particular object (e.g., "object 1" 404-1, FIG. 4) does not have texture data (e.g., texture 416, FIG. 4), and send an indication to the portable electronic device. In some embodiments, the indication is displayed on an overhead map of the portable electronic device. In some embodiments, the indication is displayed with a representation of one or more objects in the three-dimensional model. For example, an object with missing texture data may be displayed in a distinct color. This reduces user error (e.g., a user failing to obtain texture data for one or more objects).

In some embodiments, the device receives (634) an image rendered from information for one or more objects in the three-dimensional model and texture data for the one or more objects in the three-dimensional model, and displays at least a portion of the rendered image. For example, the three-dimensional model engine 322 (FIG. 3) in the remote server 102 renders the image from information for one or more objects in the three-dimensional model (e.g., shape, size, and orientation) and texture data, and sends the rendered image to the portable electronic device. The device receives the rendered image and displays at least a portion of the rendered image.

In some embodiments, the device receives (636) a touch gesture on the touch-sensitive display; and adjusts the texture data in accordance with the touch gesture. For example, an image of a door, when used as texture data for a door object in the three-dimensional model, may not align well with the door object (e.g., the image of a door may be tilted relative to the door object). The device receives one or more touch gestures (e.g., a rotate gesture) and adjusts the texture data accordingly (e.g., rotates the image of the door to align it with the door object).

In some embodiments, adjusting the texture data includes (638) one or more of: positioning the texture data onto one or more objects in the three-dimensional model; resizing the texture data; and cropping the texture data.

In some embodiments, the image rendered from information for one or more objects in the three-dimensional model and texture data for the one or more objects in the three-dimensional model includes an image of a plurality of texture tiles mapped onto at least a portion of the one or more objects, a respective texture tile corresponding to the texture data. For example, texture data may represent a portion of an object (e.g., a wood grain image for a portion of a door). In such cases, the texture data may be used as a texture tile, and a plurality of texture tiles is mapped onto a surface of one or more objects (e.g., the texture data is used multiple times to cover the surface of one or more objects).

In some embodiments, the device receives (640) information for camera placement, the information for camera placement based at least on a viewing angle and a field of view with respect to one or more objects. For example, as described above with respect to FIGS. 5F and 5G, the device receives and displays recommended camera locations.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Moreover, in the foregoing description, numerous specific details are set forth to provide a thorough understanding of the embodiments. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

It will also be understood that, although the terms first, second, etc. may be used herein to describe various elements, these elements should not be limited by these terms. These terms are only used to distinguish one element from another. For example, a first region could be termed a second region, and, similarly, a second region could be termed a first region, without departing from the scope of the present invention. The first region and the second region are both regions, but they are not the same region.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for obtaining texture data for a three-dimensional model, comprising:
   at a portable electronic device including a camera, one or more processors, and memory storing one or more programs, the one or more processors executing the one or more programs to perform the operations of:
   obtaining with the camera a live-video of real-world objects as the portable electronic device moves;
   obtaining a three-dimensional model including at least one virtual object;
   concurrently displaying at least a portion of the live-video in real-time and a representation of the three-dimensional model, wherein the representation of the three-dimensional model at least partially overlays the display of the portion of the live-video; and
   while concurrently displaying at least the portion of the live-video in real-time and the representation of the three-dimensional model:
   aligning the representation of one or more virtual objects in the three-dimensional model with one or more real-world objects in the live-video in real-time;
   storing an image of the one or more real-world objects captured by the camera in real-time as texture data for the one or more virtual objects in the three-dimensional model;
   concurrently displaying an overhead view of the three-dimensional model and displaying as part of the overhead view a depiction of a field of view of the camera; and
   subsequent to obtaining an image of objects with the camera:
   determining a recommended location of the camera for obtaining the texture data; and
   visually indicating in the overhead view the recommended location of the camera for obtaining the texture data.

2. The method of claim 1, wherein the one or more virtual objects in the three-dimensional model correspond to the one or more real-world objects in the live-video, and aligning the representation of one or more virtual objects in the three-dimensional model with one or more real-world objects in the live video includes:
   associating a first set of markers placed in the three-dimensional model with a second set of markers placed in the image.

3. The method of claim 2, wherein the device includes a touch-sensitive display and the method includes:
   receiving one or more touch gestures on the touch-sensitive display; and
   aligning the representation of the one or more virtual objects in the three-dimensional model in accordance with the one or more touch gestures.

4. The method of claim 3, wherein aligning the one or more virtual objects includes one or more of:
   scaling the representation of the one or more virtual objects in the three-dimensional model;
   panning the representation of the one or more virtual objects in the three-dimensional model; and
   rotating the representation of the one or more virtual objects in the three-dimensional model.

5. The method of claim 2, wherein the live-video includes one or more augmented reality markers and the method includes:
   aligning the representation of the one or more virtual objects in the three-dimensional model in accordance with respective locations of the one or more augmented reality markers.

6. The method of claim 5, further comprising:
   calibrating one or more of a location and an orientation of the portable electronic device in accordance with at least one of the one or more augmented reality markers.

7. The method of claim 5, wherein:
   information for the one or more augmented reality markers is received at the portable electronic device from a remote server,
   the one or more augmented reality markers received at the portable electronic device are selected and updated in accordance with a location of the portable electronic device as the portable electronic device moves.

8. The method of claim 1, further comprising:
obtaining a plurality of images at a respective location; and
generating a respective three-dimensional model of the respective location based on the plurality of images, including identifying one or more interfaces of walls by using edge detection.

9. The method of claim 8, wherein the device includes an orientation sensor and the method includes:
obtaining the plurality of images at the respective location with orientation information for the plurality of images; and
generating the respective three-dimensional model of the respective location based on the plurality of images and the orientation information.

10. The method of claim 1, wherein the image is sent to a remote server as texture data for the one or more virtual objects in the three-dimensional model.

11. The method of claim 10, wherein additional texture data is sent to the remote server from a plurality of portable electronic devices, distinct from the portable electronic device.

12. The method of claim 1, further comprising:
receiving an image rendered from information for the one or more virtual objects in the three-dimensional model and texture data for the one or more virtual objects in the three-dimensional model; and
displaying at least a portion of the rendered image.

13. The method of claim 12, further comprising:
receiving a touch gesture on the touch-sensitive display; and
adjusting the texture data in accordance with the touch gesture while maintaining the representation of the one or more virtual objects in the three-dimensional model, wherein adjusting the texture data includes one or more of:
positioning the texture data onto the one or more virtual objects in the three-dimensional model;
resizing the texture data; and
cropping the texture data.

14. The method of claim 1, further comprising:
receiving information for camera placement, the information for camera placement based at least on a viewing angle and a field of view with respect to the one or more virtual objects.

15. The method of claim 1, wherein a virtual object of the one or more virtual objects with missing texture data is displayed in a distinct color.

16. The method of claim 1, including:
concurrently displaying at least the portion of the live-video in real-time and a second representation of the three-dimensional model, wherein the second representation of the three-dimensional model at least partially overlays the display of the portion of the live-video, the image is applied as the texture data for the one or more virtual objects in the three-dimensional model.

17. A non-transitory computer readable storage medium storing one or more programs for execution by one or more processors of an electronic device with a camera, the one or more programs including instructions for:
obtaining with the camera a live-video of real-world objects as the portable electronic device moves;
obtaining a three-dimensional model including at least one virtual object;
concurrently displaying at least a portion of the live-video in real-time and a representation of the three-dimensional model, wherein the representation of the three-dimensional model at least partially overlays the display of the portion of the live-video; and
while concurrently displaying at least the portion of the live-video in real-time and the representation of the three-dimensional model:
aligning the representation of one or more virtual objects in the three-dimensional model with one or more real-world objects in the live-video in real-time;
storing an image of the one or more real-world objects captured by the camera in real-time as texture data for the one or more virtual objects in the three-dimensional model;
concurrently displaying an overhead view of the three-dimensional model and displaying as part of the overhead view a depiction of a field of view of the camera; and
subsequent to obtaining an image of objects with the camera:
determining a recommended location of the camera for obtaining the texture data; and
visually indicating in the overhead view the recommended location of the camera for obtaining the texture data.

18. The computer readable storage medium of claim 17, wherein the one or more virtual objects in the three-dimensional model correspond to the one or more real-world objects in the live-video, and aligning the representation of one or more virtual objects in the three-dimensional model with one or more real-world objects in the live video includes:
associating a first set of markers placed in the three-dimensional model with a second set of markers placed in the image.

19. An electronic device, comprising:
a camera;
one or more processors; and
memory storing one or more programs, which, when executed by the one or more processors, cause the electronic device to perform the operations of:
obtaining with the camera a live-video of real-world objects as the portable electronic device moves;
obtaining a three-dimensional model including at least one virtual object;
concurrently displaying at least a portion of the live-video in real-time and a representation of the three-dimensional model, wherein the representation of the three-dimensional model at least partially overlays the display of the portion of the live-video; and
while concurrently displaying at least the portion of the live-video in real-time and the representation of the three-dimensional model:
aligning the representation of one or more virtual objects in the three-dimensional model with one or more real-world objects in the live-video in real-time;
storing an image of the one or more real-world objects captured by the camera in real-time as texture data for the one or more virtual objects in the three-dimensional model;
concurrently displaying an overhead view of the three-dimensional model and displaying as part of the overhead view a depiction of a field of view of the camera; and
subsequent to obtaining an image of objects with the camera:

determining a recommended location of the camera for obtaining the texture data; and visually indicating in the overhead view the recommended location of the camera for obtaining the texture data.

20. The device of claim 19, wherein the one or more virtual objects in the three-dimensional model correspond to the one or more real-world objects in the live-video, and aligning the representation of one or more virtual objects in the three-dimensional model with one or more real-world objects in the live video includes:

associating a first set of markers placed in the three-dimensional model with a second set of markers placed in the image.

* * * * *